United States Patent
Jung et al.

(10) Patent No.: US 9,403,351 B2
(45) Date of Patent: Aug. 2, 2016

(54) FILM LAMINATING APPARATUS AND METHOD FOR A FLAT OR CURVED PLATE MEMBER

(71) Applicant: LG ELECTRONICS INC., Seoul (KR)

(72) Inventors: Hyungi Jung, Changwon-Si (KR); Minkyu Hwang, Gimhae-Si (KR); Sangyong Lee, Gyeongju-Si (KR); Kyungdo Kim, Busan (KR); Seokjae Jeong, Gimhae-Si (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 13/733,654

(22) Filed: Jan. 3, 2013

(65) Prior Publication Data

US 2013/0168010 A1 Jul. 4, 2013

(30) Foreign Application Priority Data

Jan. 4, 2012 (KR) .................. 10-2012-0001126
Jan. 4, 2012 (KR) .................. 10-2012-0001129

(51) Int. Cl.
| | |
|---|---|
| *B29C 65/00* | (2006.01) |
| *B32B 37/00* | (2006.01) |
| *B65H 5/00* | (2006.01) |
| *B65H 7/00* | (2006.01) |
| *B32B 38/18* | (2006.01) |
| *B32B 37/18* | (2006.01) |

(Continued)

(52) U.S. Cl.
CPC ............ *B32B 38/18* (2013.01); *B32B 37/0053* (2013.01); *B32B 38/1858* (2013.01); *B32B 38/1866* (2013.01); *B32B 37/182* (2013.01); *B32B 38/1841* (2013.01); *B32B 2509/00* (2013.01)

(58) Field of Classification Search
CPC .. B29C 65/00; B29C 66/00145; B32B 37/00; B32B 37/10; B65H 5/00; B65H 5/06; B65H 5/08; B65H 5/20; B65H 5/22; B65H 5/226; B65H 7/00; B65H 7/02; B65H 7/06; B65H 7/08; B65H 7/10; B65H 20/12

See application file for complete search history.

(56) References Cited

U.S. PATENT DOCUMENTS 3,873,395 A * 3/1975 Ehrlich .................... B27D 3/00
100/211
5,968,445 A * 10/1999 McCarville ............. B29C 70/44
156/285

(Continued)

FOREIGN PATENT DOCUMENTS

| | | |
|---|---|---|
| CN | 1717151 A | 1/2006 |
| CN | 101795950 A | 8/2010 |
| EP | 2 327 547 A1 | 6/2011 |

*Primary Examiner* — Michael N Orlando
*Assistant Examiner* — Matthew Hoover
(74) *Attorney, Agent, or Firm* — Birch, Stewart, Kolasch & Birch, LLP (57) ABSTRACT

A film laminating apparatus and method for a plate member having a flat or curved surface includes a first holder, a pressing roll, a film holder, support means, position confirmation means and alignment means. The first holder has absorption means that allows a plate member to be absorbed to a surface thereof by deforming the plate member. The pressing roll presses a film on a surface of the plate member absorbed to the first holder. The film holder is provided to the pressing roll, and fixes the film to be laminated to a surface of the pressing roll. The support means supports the pressing roll to be movable. The position confirmation means confirms the position of the plate member and the position of the film fixed to the pressing roll. The alignment means aligns the film and the plate member, based on the positions confirmed by the position confirmation means.

9 Claims, 4 Drawing Sheets

(56) References Cited

U.S. PATENT DOCUMENTS 8,887,781 B2  11/2014  Kodera
2009/0211070 A1* 8/2009 Schneider ............ B65H 23/025
                                                              26/98
2010/0206485 A1* 8/2010 Kodera ................. B29C 63/024
                                                              156/358
2011/0120619 A1* 5/2011 Harada ............... B29C 65/4835
                                                              156/64

* cited by examiner

FILM LAMINATING APPARATUS AND METHOD FOR A FLAT OR CURVED PLATE MEMBER

CROSS-REFERENCE TO RELATED APPLICATIONS

Pursuant to 35 U.S.C. §119(a), this application claims the benefit of earlier filing date and right of priority to Korean Applications Nos. 10-2012-0001126 and 10-2012-0001129, filed on Jan. 4, 2012, the contents of which is incorporated by reference herein in its entirety.

BACKGROUND OF THE INVENTION

1. Field of the Invention

The present disclosure relates to a film laminating apparatus and method for a flat or curved plate member, and particularly, to an apparatus and method for is laminating a film having a predetermined pattern or texture on a surface of a plate member having an arbitrary shape.

2. Description of the Conventional Art

A cabinet forming the external shape of a home appliance such as a washing machine or refrigerator is processed to have a predetermined shape by performing a machining process such as pressing or deep drawing on a panel made of carbon steel, stainless steel, etc.

Various colors may be applied to the cabinet so that the cabinet has a beautiful exterior appearance. The cabinet may entirely have one color or may have a color of two or more tones so as to look more luxurious. A method of coating pigments with two colors on the surface of a metal panel may be considered so that the surface of the metal panel has various colors. However, the method is not used for luxury products due to low durability and poor quality of exterior appearance.

A method of laminating a film having a specific pattern or metallic texture on the surface of a panel may be used as another method. The method can provide the panel with a texture similar to that of an actual metal material, but has a problem in that its application range is limited. That is, in case of a home appliance, a panel has not only an irregular surface such as a protruding portion or concave portion but also various shape including a flat surface, a curved surface, etc. Therefore, it is not easy to uniformly laminate a film on the panel having an arbitrary shape.

Figure 1:
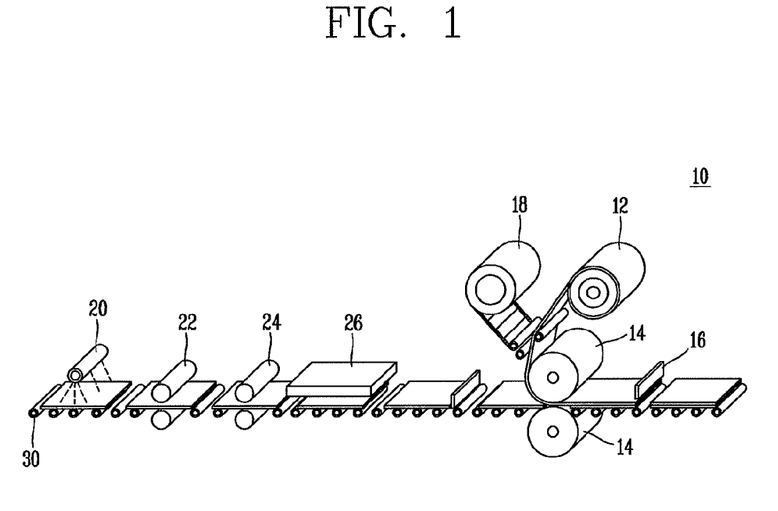
FIG. 1 is a perspective view schematically illustrating a conventional film laminating apparatus.

That is, as shown in FIG. 1, a conventional film laminating apparatus 10 is configured by receiving a film supplied from a film supply roll 12 for supplying the is film to be laminated, laminating the film on a surface of a plate member using a pair of pressing rolls 14 and then cutting the film to a predetermined size using a cutter. A protective film laminated on the rear of the film is wound around a winding roll 18 after the film is delaminated from the protective film.

The plate member is washed by sequentially passing through a water supply nozzle 20, a brush 22, a moisture removal device 24 and a dryer 26, and then transferred to the pressing roll 14 by a roller 30.

The film laminating apparatus continuously laminates the film on the plate member, so that it is possible to uniformly maintain quality and to improve productivity. However, the film laminating apparatus is limited to the case where the member on which the film is to be laminated is a plate member.

Therefore, the film should be manually laminated on a panel having a curved surface or protruding portion. In this case, it is highly likely that a variation in quality may occur, and the productivity is not high.

SUMMARY OF THE INVENTION

Therefore, an aspect of the detailed description is to provide a film laminating apparatus capable of easily laminating a film even on a panel having a protruding portion or curved surface.

Another aspect of the detailed description is to provide a film laminating method capable of easily laminating a film even on a panel having a protruding portion or curved surface.

To achieve these and other advantages and in accordance with the purpose of this specification, as embodied and broadly described herein, a film laminating apparatus includes a first holder having an absorption means that allows a plate member to be absorbed to a surface thereof by deforming the plate member; a pressing roll pressing a film on a surface of the plate member absorbed to the first holder; a film holder provided to the pressing roll, and fixing the film to be laminated to a surface of the pressing roll; a support means supporting the pressing roll to be movable; a position confirmation means confirming the position of the plate member and the position of the film fixed to the pressing roll; and an alignment means aligning the film and the plate member, based on the positions confirmed by the position confirmation means.

When the film is laminated on the plate member having a curved surface, the plate member is deformed and absorbed on the surface of the first holder through the absorption means provided to the first holder, so that the lamination of the film using the pressing roll is possible. Accordingly, the film can be automatically laminated on plate members having various shapes, so that it is possible to obtain panels having uniform quality and to improve productivity.

The absorption means may include a plurality of absorption holes formed in an upper surface of the first holder; and a vacuum pump forming negative pressure in the absorption holes. In addition, the film holder provided to the pressing roll may have the same configuration.

The support means may be configured to move the pressing roll along a lamination direction of the film on the plate member. The support means may include a rail extended in the length direction of the first holder; a slider mounted to move along the rail, and having the pressing roll rotatably mounted therebeneath; a driving motor rotating the pressing roll; and an ascending/descending means ascending/descending the rail in the vertical direction.

The support means may support the pressing roll to be vertically movable, and the first holder may be mounted to be movable along the lamination direction of the film.

The film may be previously trimmed in a predetermined shape and then supplied to the surface of the pressing roll. The film may be supplied in a state in which the film is wound around a film supply roll and then cut away by a cutter cutting the film after being laminated on the surface of the plate member by the pressing roll.

The film holder may further include a metal net stacked on the surface of the pressing roll. Accordingly, it is possible to minimize the deformation of the surface of the plate member due to the absorption holes provided to the film holder. The metal net may be made of stainless steel.

A concave portion recessed inward from the circumferential surface of the pressing roll may be provided to the pressing roll. In a case where a protruding portion is formed on the surface of the plate member, the concave portion allows the protruding portion to be received by the concave portion in the process of laminating the film, so that the film can be laminated up to the surroundings of the protruding portion by the pressing roll.

The concave portion may include a first cut-away surface extended toward the center of the pressing roll; and a second cut-away surface extended toward the circumference of the pressing roll from the first cut-away surface. Accordingly, the film can be laminated using the pressing roll even when the surface of the plate member is bent to be vertical or inclined.

To achieve these and other advantages and in accordance with the purpose of this specification, as embodied and broadly described herein, a film laminating apparatus includes a first holder having an absorption means that allows a plate member to be absorbed to a surface thereof by deforming the plate member; a second holder having a second absorption means that allows a film cut away in a predetermined shape to be absorbed on a surface thereof; a pressing roll attaching the absorbed film on the surface of the second holder and then pressing the film on the surface of the plate member absorbed to the first holder; a support means supporting the pressing roll to be movable between the first and second holders; a position confirmation means confirming the position of the plate member and the position of the film fixed to the pressing roll; and an alignment means aligning the film and the plate member, based on the positions confirmed by the position confirmation means.

Accordingly, the film can be stably laminated on the surface of the plate member by the pressing roll even when the film to be laminated does not have a rectangular shape but has an arbitrary shape.

The support means may include a rail extended between the first and second holders; a slider mounted to move along the rail, and having the pressing roll rotatably mounted thereeneath; a driving motor rotating the pressing roll; and an ascending/descending means ascending/descending the rail in the vertical direction.

The film may be previously trimmed in a predetermined shape and then supplied to the second holder.

To achieve these and other advantages and in accordance with the purpose of this specification, as embodied and broadly described herein, a film laminating method includes fixing a plate member in a deformed state to a first holding surface so that the first holding surface and a surface of the plate member contact each other; fixing a film to a surface of a pressing roll; pressing the pressing roll having the film fixed thereto on the surface of the plate member; and restoring the plate member to have the initial shape.

Accordingly, the automated film lamination can be performed on even the plate member having a curved surface rather than a flat surface by pressing the film in a state in which the plate member is deformed and fixed to the first holding surface and restoring the plate member to have the original shape. The plate member may have a plate shape in which the entire plate member is adhered closely to the first holding surface, or only a partial surface of the plate member may be deformed and fixed to the first holding surface. That is, the deformed surface may be limited to a region on which the film is attached.

The plate member may be deformed using various methods. For example, the plate member may be deformed by pressing the other region of the plate member except the region on which the film is attached, using a separate frame, or may be deformed using a vacuum absorption method. That is, the deforming the plate member may include deforming the plate member toward the holding surface by applying absorption pressure in the state in which the plate member is holed on the first holding surface. In this case, the restoring of the plate member may include removing the absorption pressure applied to the rear surface of the plate member having the film laminated thereon.

The fixing of the film to the surface of the pressing roll may include cutting away the film in a predetermined shape; and absorbing the cut film to the surface of the pressing roll.

The shape of the cut film may be determined, based on the state in which the plate member is deformed. That is, the film is not laminated on the plate member having the curved surface but laminated on the plate member deformed in a plate shape. Thus, if the shape of the cut film is determined in consideration of the deformation of the plate member in the cutting of the film to be laminated, the film can be more precisely laminated on the plate member.

The fixing of the film to the surface of the pressing roll may include fixing the cut film to a second holding surface; aligning the pressing roll with respect to the film; and transferring the film to the surface of the pressing roll by applying absorption pressure in a state in which the pressing roll contacts an upper surface of the film.

In the pressing of the film on the surface of the plate member, the absorption pressure between the film and the pressing roll may be set to be smaller than the adhesion between the film and the plate member.

To achieve these and other advantages and in accordance with the purpose of this specification, as embodied and broadly described herein, a film laminating method includes fixing a plate member in a deformed state to a first holding surface so that the first holding surface and a surface of the plate member contact each other; transferring, toward a pressing roll, the first holding surface having the plate member fixed thereto; supplying a film between the pressing roll and the plate member; pressing the supplied film on the surface of the plate member using the pressing roll; cutting away the film pressed on the plate member; and restoring the plate member to have the initial shape.

Accordingly, in a case where the shape of the film to be laminated is simple, the film is not cut away in advance, but cut away after the film is laminated on the plate member, thereby more quickly supplying the film.

The film may be supplied from a film supply roll around which a raw film is wound.

According to the exemplary embodiments configured as described above, the plate member having a curved surface is deformed to have a flat surface and then absorbed on the surface of the first holder, so that the lamination of the film using the pressing roll is possible. Accordingly, the film can be automatically laminated on plate members having various shapes, so that it is possible to obtain panels having uniform quality and to improve productivity.

Further, a separate holder for absorbing the film is provided, and the film absorbed to the holder is absorbed to the surface of the pressing roll, so that the film having various shapes can be automatically laminated on the plate member.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Hereinafter, a film laminating apparatus according to an exemplary embodiment will be described in detail with reference to the accompanying drawings.

Figure 2:
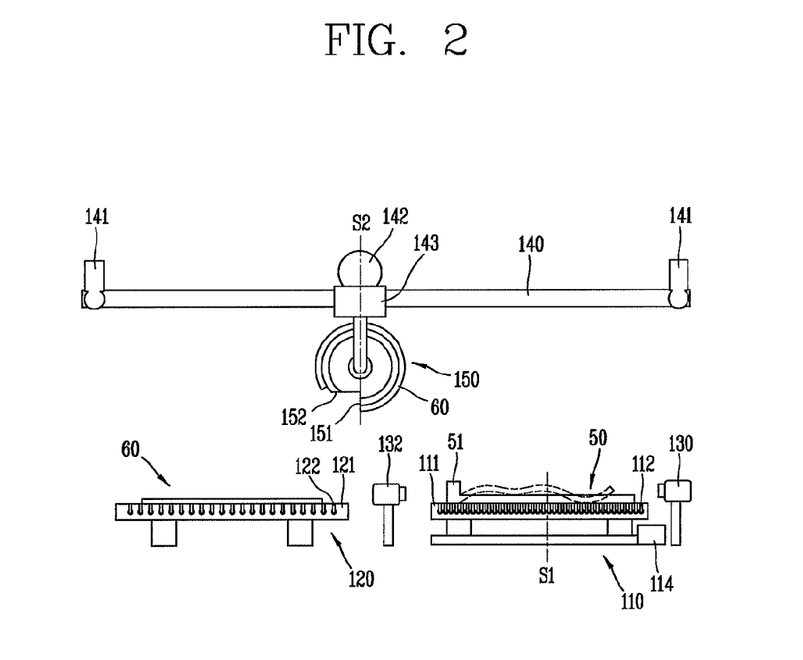
FIG. 2 is a side view schematically illustrating a film laminating apparatus according to an exemplary embodiment.

FIG. 2 is a side view schematically illustrating a film laminating apparatus according to an exemplary embodiment. Referring to FIG. 2, the film laminating apparatus 100 according to the exemplary embodiment includes a first holder 110 absorbing and holding a plate member 50, and a second holder 120 absorbing and holding a film 60 to be laminated on the plate member 50.

A plurality of absorption holes 112 are formed in the holding surface 111 of the first holder 110, and a vacuum pump (not shown) forming negative pressure in the absorption holes 112 is further provided to the first holder 110. If the vacuum pump is operated, the negative pressure is formed in the absorption holes 112 so as to absorb the plate member 50. Here, the plate member 50 is formed to have a curved surface as indicated by a dotted line. However, the plate member 50 having the curved surface is absorbed to the holding surface 111 due to the negative pressure of the absorption holes 112 so as to be deformed in the shape of a flat plate. Absorption pressure does not reach a vertical bending portion 51 formed at one end portion of the plate member 50, and therefore, the vertical bending portion 51 is disposed perpendicular to the holding surface 111 as shown in this figure.

The first holder 110 is disposed to be movable in front, rear, left and right directions with respect to the ground and to be rotatable about a line S1 as an axis. The movement of the first holder 110 is implemented by a first actuator 114 provided to the first holder 110. The configuration in which the first actuator and the first holder are disposed to be movable can be implemented using conventional ones known in the art, and therefore, its detailed description will be omitted.

The second holder 120 is disposed adjacent to the first holder 110. Like the first holder 110, a plurality of absorption holes 122 are also formed in a holding surface 121 of the second holder 120 so as to generate negative pressure. The absorption holes 122 formed in the second holder 120 are provided as a film holder for allowing the film 60 to be absorbed and fixed to the holding surface 121.

Meanwhile, first and second cameras 130 and 132 are provided around the first holder 110. The first and second cameras 130 and 132 recognize the position of the plate member 50 and transmits the recognized position to a controller (not shown), so that the controller controls the film and the plate member to be aligned in a laminating process of the film. The controller is electrically connected to the first actuator 114 so as to control the position of the first holder 110, based on information obtained by the cameras 130 and 132.

A rail 140 is provided above the first and second holders 110 and 120. The rail 140 is formed longer than the region on which the first and second holders 110 and 120 are disposed. The rail 140 is configured to be ascended and descended in the vertical direction by a pair of cylinders 141 respectively provided at both end portions thereof. A slider 143 horizontally moving along the rail 140 is mounted to the rail 140. The slider 143 has a self-driving means, and the movement of the slider 143 is controlled by the controller.

A pressing roll 150 is rotatably mounted beneath the slider 143. In FIG. 2, the pressing roll 150 rotates clockwise or counterclockwise. Meanwhile, the pressing roll 150 may be configured to be rotatable about a line S2 as a center axis by a driving motor 142 provided on the slider 143. Thus, the pressing roll 150 is controlled so that the previously set position of the pressing roll 150 can be maintained in the process of coating the film on the plate member. In addition, the pressing roll 150 can move to an arbitrary position on the first and second holding surfaces 111 and 121.

Meanwhile, a cut-away portion is provided to the pressing roll 150. The cut-away portion includes a first cut-away surface 151 extended to the center from a circumferential surface of the pressing roll 150, and a second cut-away surface 152 extended to the circumferential surface in the perpendicular direction from an end portion of the first cut-away surface 151. The cut-away portion is formed to coat the film 60 on the plate member 50 at a lower portion of the bending portion 51 of the plate member 50, which will be described later.

Figure 3:
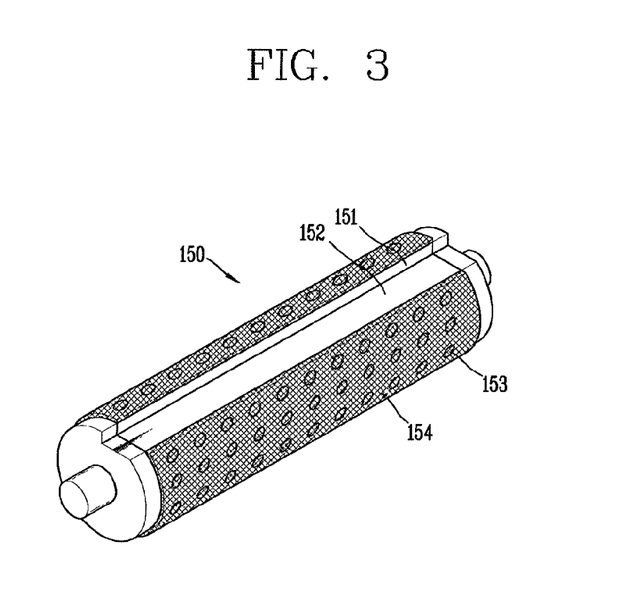
FIG. 3 is a perspective view illustrating a pressing roll in the film laminating apparatus shown in FIG. 2.

FIG. 3 is a perspective view illustrating the pressing roll 150. As shown in this figure, a plurality of absorption holes 153 are formed in the surface of the pressing roll 150, so that the film can be absorbed to the surface of the pressing roll 150. A stainless net 154 is stacked on the surface of the pressing roll 150. The stainless net 154 is provided to prevent marks from being formed on the surface of the film due to pressure applied in the laminating process of the film.

That is, in a case where the stainless net 154 is not provided, marks corresponding to the shapes of the absorption holes 153 are formed on the film when the film is pressed on the plate member. However, the stainless net 154 can prevent the absorption holes 153 from directly contacting the film while providing negative pressure to the film. Here, the stainless net 154 is made of a stainless material for the purpose of corrosion prevention, etc., but the present disclosure is not necessarily limited thereto. For example, the stainless net 154 may be made of an arbitrary material.

Figure 4:
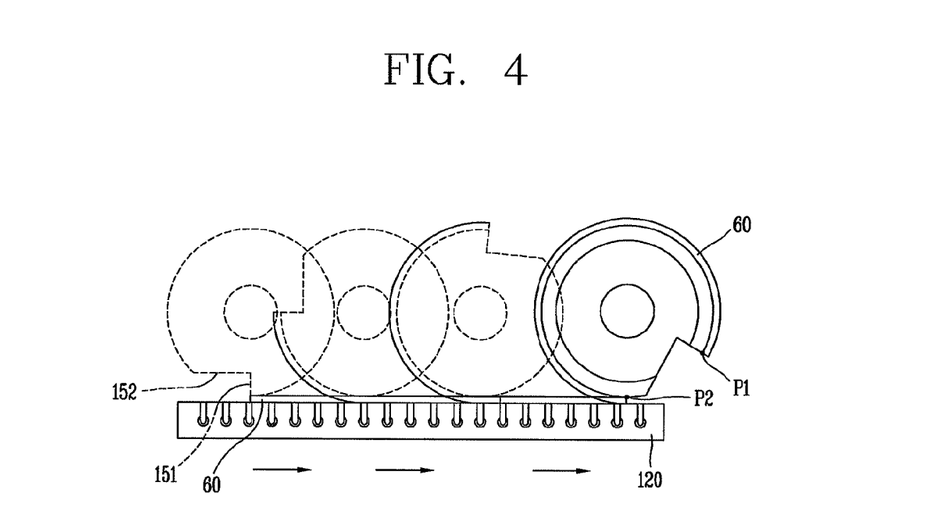
FIG. 4 is a side view illustrating a process of absorbing a film in the film laminating apparatus shown in FIG. 2.

FIG. 4 is a side view illustrating a process of transferring the film 60 absorbed and fixed to the second holder 120 to the surface of the pressing roll 150. Referring to FIG. 4, the film 60 maintains the state in which the film 60 is absorbed to the surface of the second holder 120 due to the negative pressure formed in the absorption holes 122. In this state, the pressing roll 150 is positioned so that a position P1 at the end portion of the first cut-away surface 151 is aligned at the left end of the film 60, and then transfers the film 60 to the surface of the pressing roll 150 while rotating and moving in the direction of arrows shown in FIG. 3.

Here, the negative pressure applied to the holding surface of the second holder 120 is set to be smaller than that applied to the surface of the pressing roll 150, and therefore, the film 60 is absorbed to the second holder 120 in the state in which an external force is not applied. However, if the pressing roll 150 contacts the film 60, the film 60 is separated from the second holder 120 and then transferred to the pressing roll 150.

As such, the entire film is transferred to the surface of the pressing roll 150 while the pressing roll 150 is rotating. In this case, the length of the outer circumferential surface of the pressing roll 150 except the cut-away portion is formed identical to or greater than that of the film. In FIG. 4, the length of the film is set to be smaller than that of the pressing roll 150, and therefore, the one end portion of the film is placed at a position P2 at which the second cut-away surface 152 does not approach.

Figure 5:
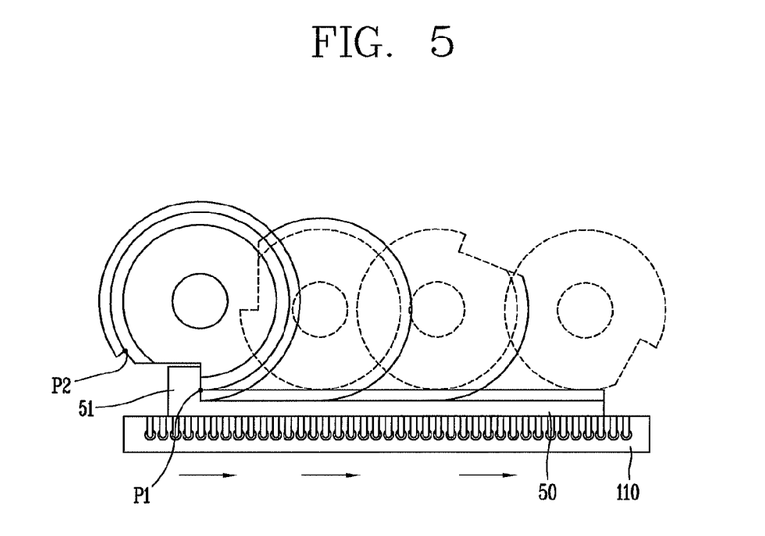
FIG. 5 is a side view illustrating a process of laminating the film in the film laminating apparatus shown in FIG. 2.

FIG. 5 is a side view illustrating a process of laminating the film attached to the pressing roll 150 on the plate member 50. Referring to FIG. 5, the pressing roll 150 is moved from the second holder 120 to the first holder 110 by the slider and the rail and then approaches the plate member 50 while descending toward the plate member 50 on the first holder 110.

In this case, the position P1 is aligned to reach the intersection point of the bending portion 51 and the plate member 50. Then, the film is laminated on the surface of the plate member 50 while the pressing roll 150 is rotating in the direction of arrows shown in FIG. 5. In this case, the length of the film is trimmed to be suitable for the length of the plate member 50. Thus, if the position P1 is aligned at a predetermined position, the position P2 is aligned with the end portion of the plate member 50. Meanwhile, a protective film for protecting an adhesive layer coated on the film is attached on the surface of the film. Thus, after the protective film is removed, the film is laminated on the plate member 50 by rotating and moving the pressing roll 150 in the direction of the arrows.

Here, the negative pressure formed in the pressing roll 150 is set to be smaller than the adhesion of the adhesive layer of the film, so that the laminated film is not again transferred to the pressing roll 150.

Figure 6:
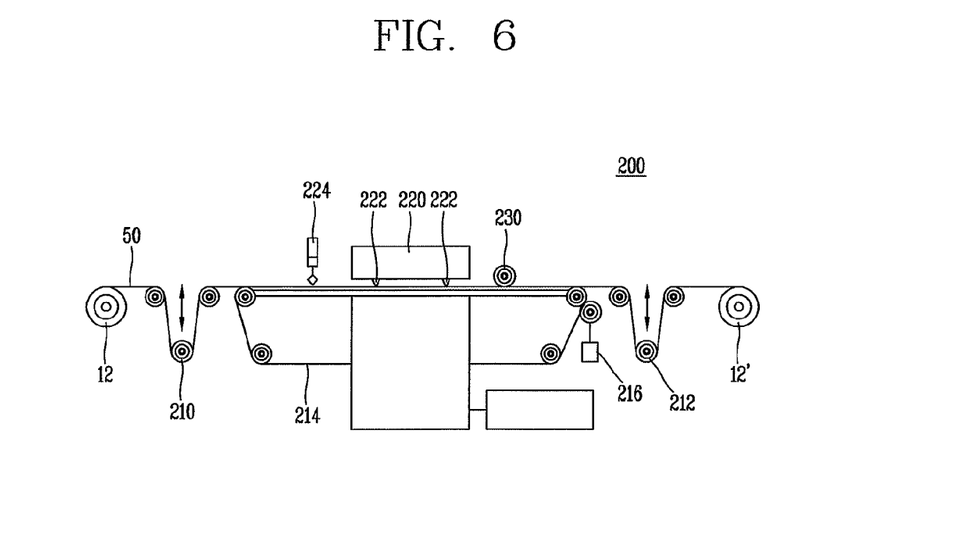
FIG. 6 is a side view schematically illustrating a trimming device provided the film laminating apparatus shown in FIG. 2.

Meanwhile, before being placed on the second holder, the film 50 is cut away to have a desired shape through a trimming process. FIG. 6 illustrates an example of a trimming device. Referring to FIG. 6, the trimming device 200 uses a film 50 supplied in the state in which the film 50 is wound around a supply roll 12, and includes two tension rolls 210 and 212 for controlling tension of the film 50 supplied from the supply roll 12 to an appropriated level. An extraction roll 12' for extracting the film remaining after the trimming process is provided at a rear end of the tension roll 212.

The film 50 supplied by the supply roll 12 is transferred to the inside of a cutting machine 220 by a conveyor belt 214 driven by a driving motor 216. The transferred film is cut away in a predetermined shape by a cutter 222 provided to the cutting machine 220. The film can be cut away in the exact shape by a sensor 224 for sensing the length and position of the supplied film. A holder 230 for preventing the movement of the film in the cutting process is additionally provided at the entrance of the cutting machine 220.

The films cut away by the trimming device 200 are supplied one by one to the second holder so as to be laminated on the plate member.

In a case where the width of the laminated film is constant, e.g., in a case where the film has a rectangular shape, the trimming device and the second holder may be omitted. In this case, in the conventional film laminating apparatus shown in FIG. 1, the plate member is not supplied to the roller 30 but may be supplied in the state in which the plate member is absorbed by the first holder. In a case where the bending portion 51 described above is not provided to the plate member, the cut-away portion formed in the pressing roll 150 may be omitted, and the pressing roll 150 may have a general circumferential shape.

Figure 7:
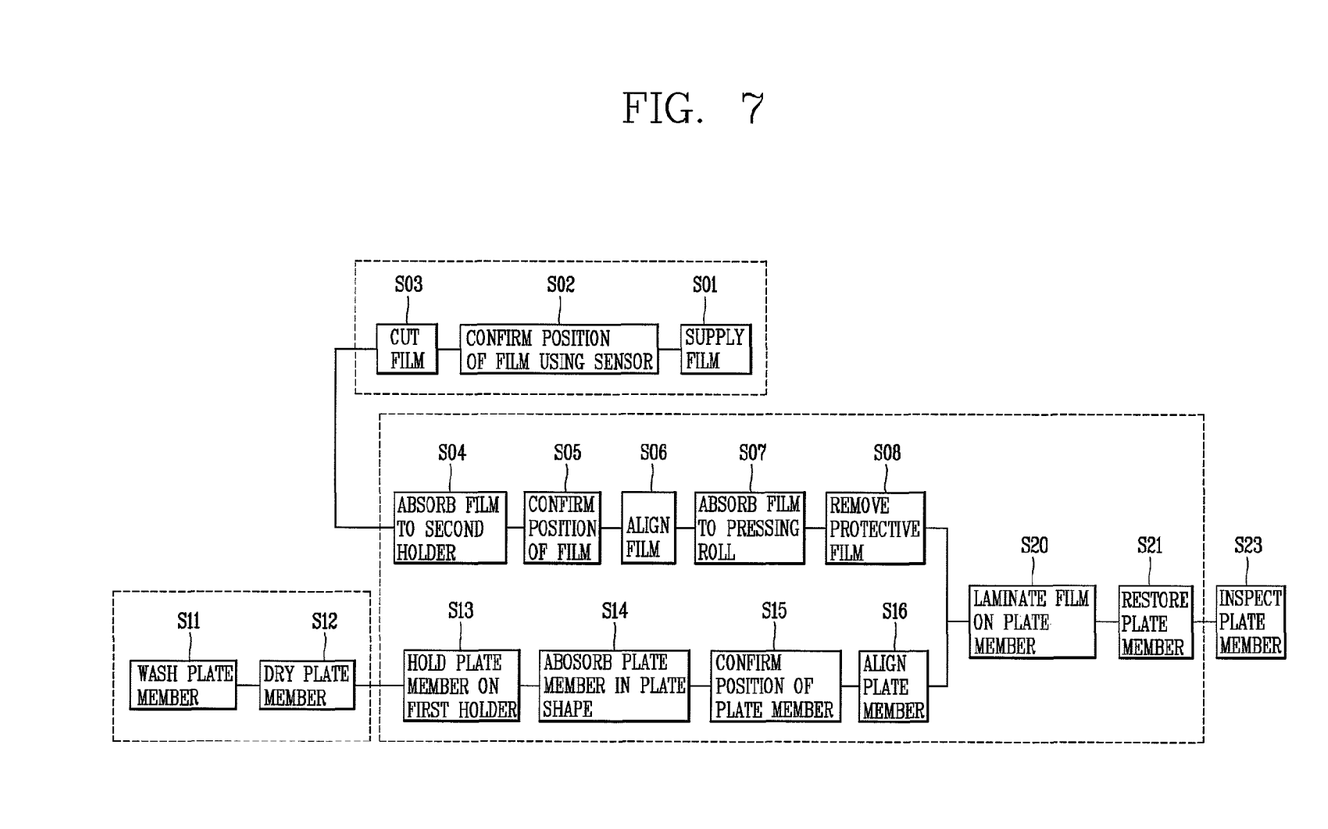
FIG. 7 is a flowchart illustrating a film laminating method using the film laminating apparatus according to an exemplary embodiment.

Hereinafter, a method of laminating a film on a plate member according to an exemplary embodiment will be described with reference to FIG. 7.

First, the film is cut away in a predetermined shape, using the trimming device. Specifically, a raw film supplied in the shape of a winding roll is loaded into the trimming device 200 (S10), and the position of the supplied film is confirmed through the sensor 224 (S02). Then, the film is cut away in a predetermined shape through the cutting machine 220 (S03). Here, the shape of the cut film is determined in consideration of the state to be deformed through the following absorption process of a plate member. That is, if the shape of the plate member is changed from a straight line into a curved line, The cut film is necessarily cut away in the curved line, corresponding to the shape of the deformed plate member. This is applied to a case where the film is laminated on the entire surface of the plate member and a case where the film is laminated on a partial surface of the plate member.

However, in a case where the degree of deformation is not large, the film may be cut away without considering the deformation.

Subsequently, the cut film is supplied and absorbed to the holding surface 121 of the second holder 120 described in the aforementioned exemplary embodiment (S04), the position of the absorbed film is confirmed using a camera (S05). Then, the film is aligned with respect to the pressing roll 150 (S06). In the alignment process, the film may be aligned by moving the second holder having the film held thereby. Alternatively, the film may be aligned by controlling the position of the pressing roll 150 as described above.

If the alignment of the film is completed, the film is absorbed to the surface of the pressing roll (S07), and a protective film attached to the surface of the film is removed (S08). The protective film may be manually removed or may be removed using a separate device or tool for removing the protective film.

Meanwhile, separately from the trimming process, the plate member is washed using a washing device shown in FIG. 1. That is, after water is sprayed onto the surface of the plate member, foreign matters are removed using the brush (S11), and the plate member is then dried (S12). The plate member washed and dried as described above is held on the holding surface 111 of the first holder 110 (S13). Then, the plate member deformed and absorbed on the holding surface by applying negative pressure to the plate member using the vacuum pump (S14). In a case where the initial shape of the plate member is flat, the deformation of the plate member may not be performed.

The position of the absorbed plate member is confirmed using the camera (S15), and then aligned with respect to the pressing roll (S16). If the procedure up to step S16 is completed, the position between the film and the plate member is aligned in a predetermined state, and therefore, the film is laminated on the surface of the plate member as described in FIG. 5 (S20). If the lamination of the film is completed, the plate member is restored to the shape of the plate member before being deformed by removing the negative pressure applied to the absorption holes (S24). Then, the film laminating process is completed through inspection (S25).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A film laminating apparatus, comprising:
    a first holder having an absorption means that allows a plate member having an arbitrary shape to be absorbed to an upper flat surface of the first holder by deforming the plate member into a shape of a flat plate;
    a pressing roll pressing a film on a surface of the plate member absorbed to the first holder;
    a film holder provided to the pressing roll, and fixing the film to be laminated to a surface of the pressing roll;
    a support means supporting the pressing roll to be movable;
    a position confirmation means confirming the position of the plate member absorbed to the first holder and the position of the film fixed to the pressing roll; and
    an alignment means aligning the film and the plate member, based on the positions confirmed by the position confirmation means,
    wherein the absorption means includes:
        a plurality of absorption holes formed in the upper flat surface of the first holder; and
        a vacuum pump forming negative pressure in the absorption holes,
    wherein a concave portion recessed inward from an outer circumferential surface of the pressing roll is provided to the pressing roll, the concave portion including:
        a first cut-away surface extended toward a center of the pressing roll from the outer circumferential surface of the pressing roll; and
        a second cut-away surface extended toward the outer circumferential of the pressing roll from the first cut-away surface, and
    wherein the first and second cut-away surfaces extend along a lengthwise direction of the pressing roll.

2. The film laminating apparatus of claim 1, wherein the support means is configured to move the pressing roll along a lamination direction of the film on the plate member.

3. The film laminating apparatus of claim 2, wherein the support means includes:
    a rail extended in the length direction of the first holder;
    a slider mounted to move along the rail, and having the pressing roll rotatably mounted therebeneath;
    a driving motor rotating the pressing roll; and
    an ascending/descending means ascending/descending the rail in the vertical direction.

4. The film laminating apparatus of claim 1, wherein the support means supports the pressing roll to be vertically movable, and the first holder is mounted to be movable along the lamination direction of the film.

5. The film laminating apparatus of claim 1, wherein the film is previously trimmed in a predetermined shape and then supplied to the surface of the pressing roll.

6. The film laminating apparatus of claim 1, wherein the film is supplied in a state in which the film is wound around a film supply roll, and the film laminating apparatus further include a cutter cutting the film after being laminated on the surface of the plate member by the pressing roll.

7. The film laminating apparatus of claim 1, wherein the film holder includes:
    a plurality of absorption holes provided to the pressing roll;
    a vacuum pump forming negative pressure inside the absorption holes; and
    a metal net stacked on the surface of the pressing roll.

8. The film laminating apparatus of claim 1, further comprising a second holder adjacent the first holder, the second holder having an absorbing means that allows the film to be absorbed to a flat surface thereof.

9. The film laminating apparatus of claim 8, wherein the pressing roll is configured to transport the film between the second holder and the first holder.

* * * * *